Dec. 8, 1970     H. L. BURNETT     3,546,549
CONTROL SYSTEM FOR MACHINE TOOLS
Filed Aug. 21, 1967     3 Sheets-Sheet 1
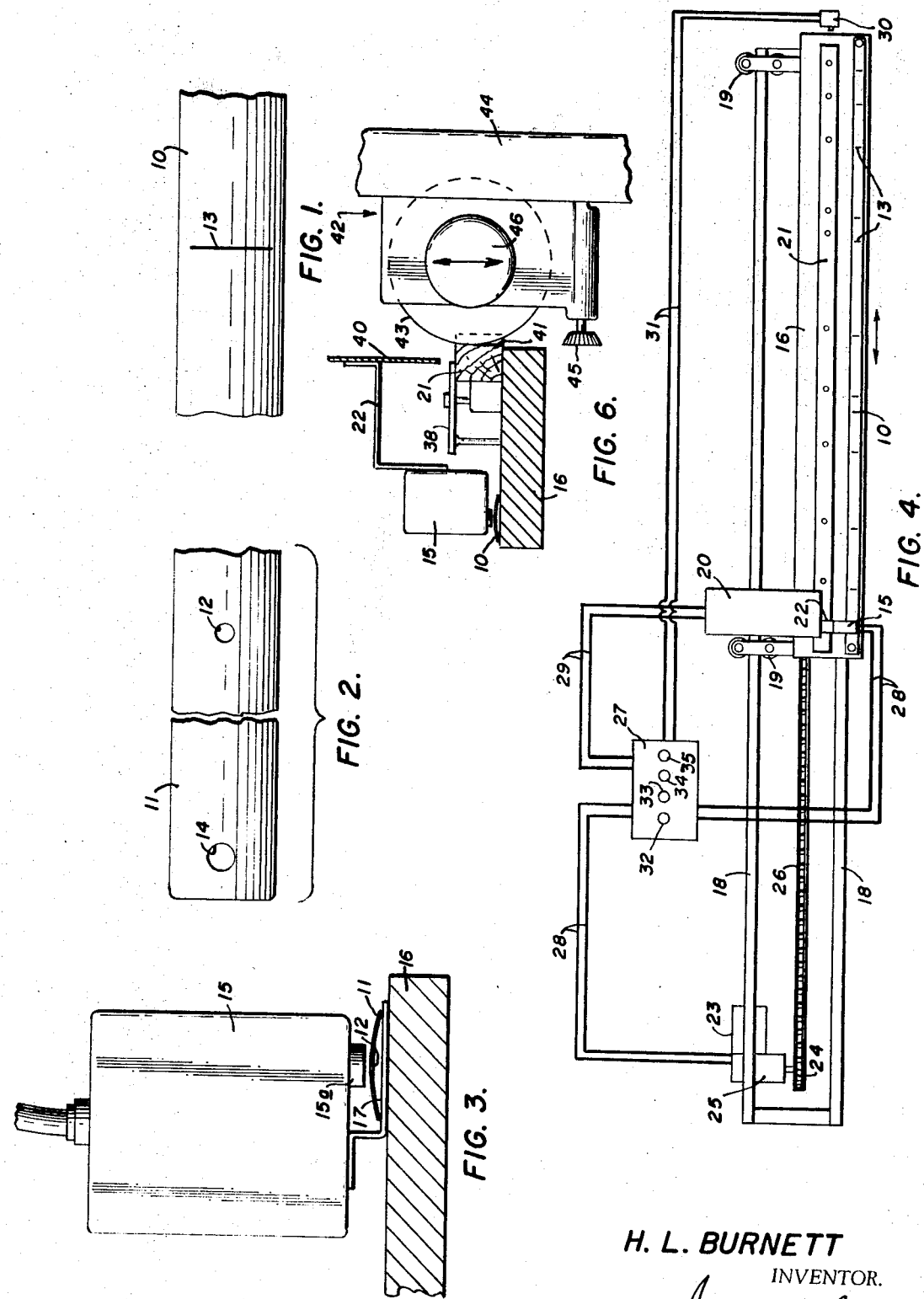
H. L. BURNETT
INVENTOR.
BY *Herbert J. Brown*
ATTORNEY

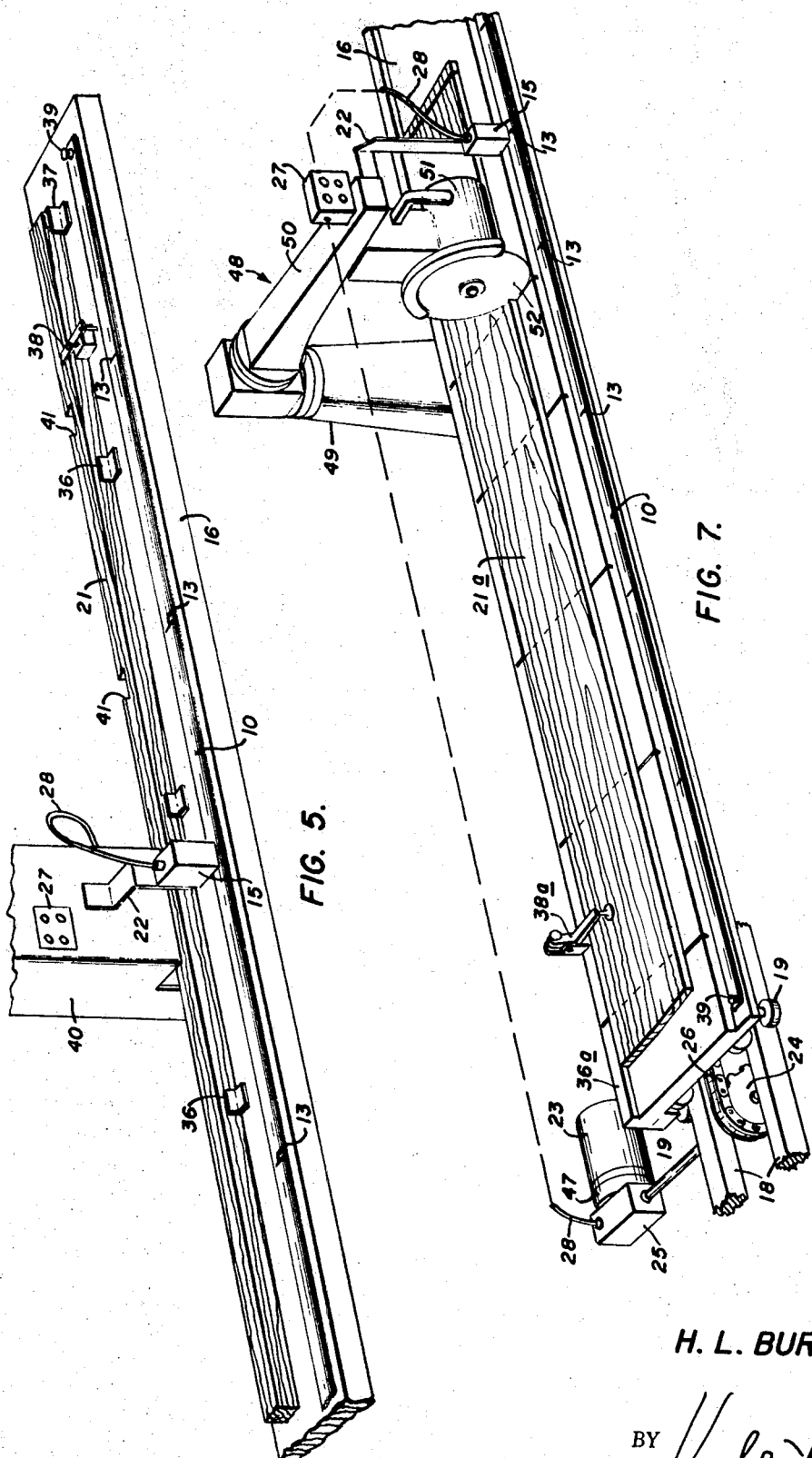

Dec. 8, 1970   H. L. BURNETT   3,546,549
CONTROL SYSTEM FOR MACHINE TOOLS
Filed Aug. 21, 1967   3 Sheets-Sheet 3
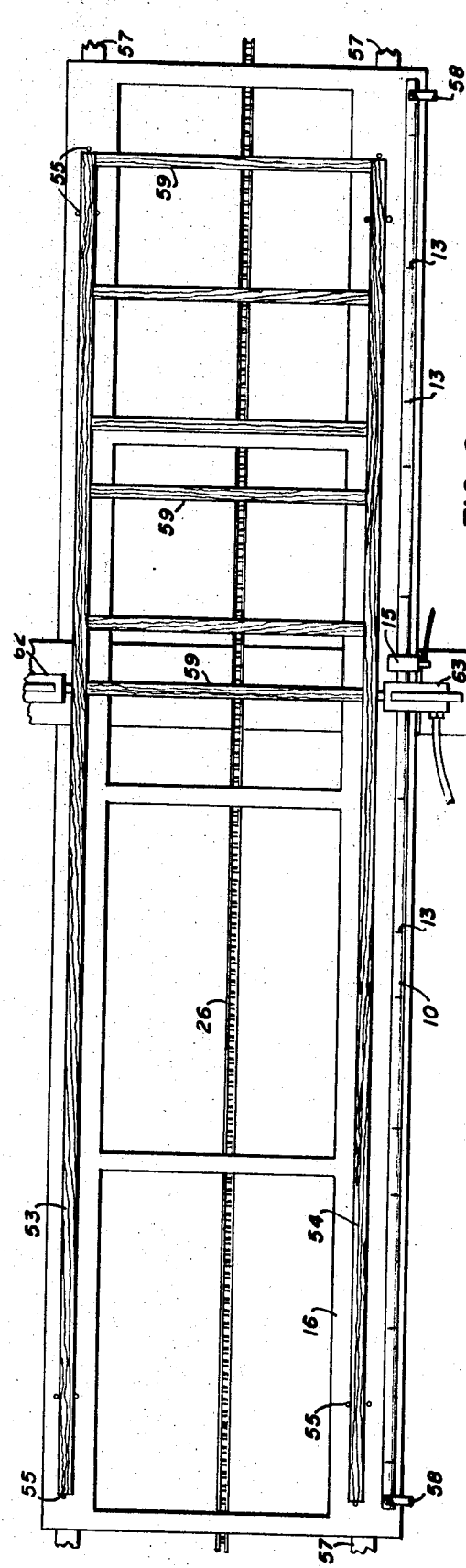
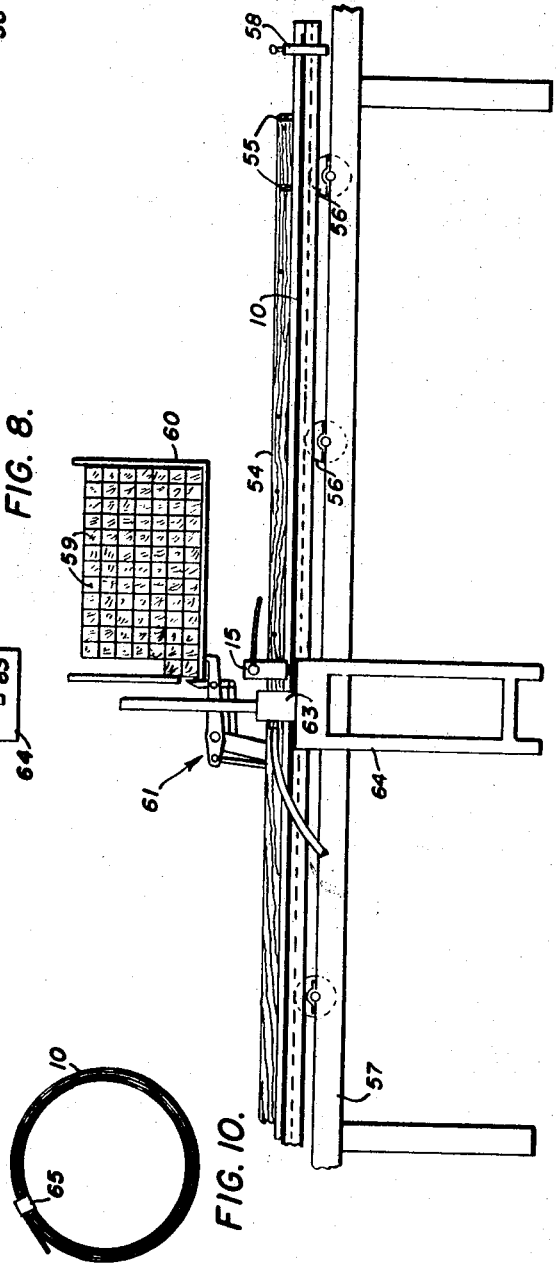
H. L. BURNETT
INVENTOR.
BY *Herbert J. Brown*
ATTORNEY

United States Patent Office 3,546,549
Patented Dec. 8, 1970

3,546,549
CONTROL SYSTEM FOR MACHINE TOOLS
H. L. Burnett, Hurst, Tex., assignor to General Construction Automation Inc., Fort Worth, Tex., a corporation of Texas
Filed Aug. 21, 1967, Ser. No. 662,024
Int. Cl. G05b 19/04
U.S. Cl. 318—162                    1 Claim

ABSTRACT OF THE DISCLOSURE

A control system for a machine tool for performing accurately spaced repeat operations on an elongate workpiece in which a tape carrying markings readable by an electric eye is fixed parallel to the workpiece on a carriage propelled by a drive responsive to the electric eye and in which the machine tool performs its operation on the workpiece at a location corresponding to each mark on the tape.

---

This invention relates to automated wood working machinery designed for the purpose of notching, nailing or cutting the longer frame members of house trailers or the like in which a close tolerance is required, but it could also be adapted for use in similar phases of manufacture in other materials. In assembling the wall frames of a house trailer it is necessary to nail the studs between the top and bottom plates at accurately located intervals, but these intervals are not the same where doors or windows occur, so the spacing of the studs has to be programmed for each wall of the trailer.

An object of the invention is to provide a system of programming which is cheap, accurate and simple to set up, and in which it is possible to substitute one program for another with a minimum of time and effort.

Another object is to provide means whereby any given program may be stored for re-use at any time.

The basis of the system herein described is a metal tape somewhat longer than the workpiece to which it is matched, on which the intervals of operation can be located on the same scale as the workpiece, thus reducing the chance of error to a minimum. The intervals are marked by means of a black line on a white background, or by punching a hole, as explained in the following description or by any other type of mark that can be read by an electric eye. Because of its availability and low cost, venetian blind stock is used for the tape and in all the following examples, but other kinds of non-stretchable material could be used as well.

The tape and the workpiece are clamped parallel on a carriage which is driven past the machine tool by an electric drive with over-run clutch and instantaneous brake which can stop the workpiece within no more than 1/32 inch of the desired point in response to a signal from the electric eye.

In the drawing accompanying the following description of the invention:

FIG. 1 is a short section of the tape showing a typical interval mark.

FIG. 2 is a short section of the tape in which a perforation instead of a surface mark is used.

FIG. 3 is a side elevation of a typical electric eye unit mounted above the tape with a reflector underneath for reading through the perforations.

FIG. 4 is a diagrammatic plan view of a typical machine tool set up in accordance with the invention.

FIG. 5 is a partial perspective view of a router set up to put dovetail notches in a wall plate.

FIG. 6 is a cross sectional detail from FIG. 5 to show the position of the router within the housing.

FIG. 7 is a partial perspective of a machine set up to cut boards into short pieces of varying lengths.

FIG. 8 is a partial plan view of a machine set up to nail studs between two wall plates.

FIG. 9 is a partial side elevation of the machine illustrated in FIG. 8.

FIG. 10 is an illustration of how the programming tape can be rolled up for storage.

Although all the machines illustrated herein are shown using a tape 10 with surface markings, the perforated tape 11 illustrated in FIG. 2 can be used on any of them and has certain advantages in that the perforations 12 marking the intervals are permanent and not subject to accidental erasure or distortion as are the surface markings 13 shown in FIG. 1. Locating holes 14 can be punched at each end of the tape or it can be attached with C-clamps as described hereinafter.

In FIG. 3 the electric eye unit 15 is shown positioned above the carriage 16 to which is attached the perforated tape 11 which slides over a reflector 17 and causes the electric eye to produce a signal when the perforation 12 is exactly in line with the lens 15a of the electric eye. In case the surface marked tape 10 is used, the reflector 17 is not required.

Some of these elements are illustrated in FIG. 4 in which the carriage 16 rides on a pair of ways 18 guided by rollers 19. A machine tool 20 is mounted over the ways 18 in a way to perform the required operations on the workpiece 21 and the electric eye 15 is attached to the machine tool by a bracket 22. A drive motor 23 runs a sprocket 24 through a gear box 25 and moves the carriage back and forth by means of a chain 26. A control panel 27 contains the necessary switches and relays whereby the signal from the electric eye 15 is conveyed through a line 28 to the motor 23 and through a line 29 to the machine tool. A limit switch 30 reverses the carriage after the final operation, the switch being connected to the control panel by a line 31. The control panel 27 is equipped with buttons for manual operation and safety and has a starting button 32, a stop button 33, an override button 34 whereby the machine can be made to skip any marked interval or station and an emergency reverse button 35. As shown in FIG. 4, the carriage is in position for the final operation on the workpiece 21. After the cycle is completed the carriage will continue in the same direction until reversed by the limit switch 30, when it will return to its starting position (to the left on the drawing) where the workpiece is removed by hand and another inserted. Then the machine is started manually with the starting button 32 and the cycle is repeated.

FIG. 5 illustrates the use of the invention for cutting dovetail notches at specified intervals in a stringer or wall plate. In this view the workpiece 21 is held in place on the carriage 16 by cleats 36, a locating stop 37 and a clamp 38 at each end. The tape 10 is secured by thumbscrews 39 through the locating holes 14. The electric eye 15 is attached to the router housing 40 by the bracket 22. A mark 13 on the tape 10 corresponds to each station at which a dovetail 41 is cut. FIG. 6 illustrates the position of a standard router 42 within the housing 40 in which the cutter blade 43 first notches the workpiece 21 as it travels upward on the machine post 44 and is followed by the router blade 45 both driven by the same motor 46. The router descends through the same cut 41 and at the bottom of its stroke closes a switch (not shown) which, working through the control panel 27, starts the drive motor 23 to move the carriage 16 another interval.

FIG. 7 illustrates the use of the invention for cutting a board into short pieces of equal or varying lengths. In production of cabinets or the like, the available raw material may divide more economically into three pieces of one length and three of another length, for example, than if all the pieces of a certain length were cut from the same stock. As shown here the tape 10 can be programmed to trim the ends of the board 21a and cut it into pieces of any desired length. There is no need to exactly locate the board on the carriage 16, which would require an initial trimming operation, and sawdust getting behind end stops is a frequent cause of errors. A single clamp 38a is sufficient to hold the board 21a on the carriage 16 against the fence 36a during the cutting operation. Included in this view is the drive motor 23, the overrun clutch and brake section 47 as well as the gear box 25. A radial saw 48 having a stand 49, a head 50, a motor 51 and a blade 52 is mounted in the correct position for making the cuts as the board 21a is moved along by the carriage 16. The saw 48 is operated by hand to make the cut each time the electric eye 15, mounted on the head 50 by means of the bracket 22, stops the carriage at the point determined by the mark 13 on the tape 10. In this case the machine can be wired so that a button on the control panel 27 can be pressed to move the carriage to the next station.

FIGS. 8 and 9 illustrate the use of the invention to program the automatic nailing of a side section of a house trailer. In the past the construction of these frames required the notching of the top and bottom plates in order to accurately locate the studs during the assembly operation. In the described machine the top and bottom plates 53 and 54 respectively are dropped by hand onto the carriage 16 between the locating pins 55 on the carriage, which in this case travels on rollers 56 attached to a base frame 57.

In FIG. 9 it is shown how the tape 10 can be attached to the carriage 16 by C-clamps 58 in lieu of the thumbscrews 39 shown in FIG. 5. In some applications it may be easier to make longitudinal adjustments on the location of the tape than on the location of the workpiece.

Studs 59 precut to exact length are stacked in a rack 60 (shown only in FIG. 9) where they can be fed automatically by an electrically or pneumatically powered linkage to each station between the plates 53 and 54. A conventional linkage of this type 61 is partially illustrated in FIG. 9, and it is activated by the same signal from the electric eye 15 that stops the carriage 16 at the precise location for each stud. Pneumatic nailers 62 and 63 which are mounted on a stand 64 integral with the base frame 57 are also activated by the signal from the electric eye 15. The control panel, not shown, similar to that described in FIG. 4 is located above the machine where the operator can sit on a platform and watch the stud loading linkage and stop the machine in case of malfunction, or skip certain stations where it is desired to insert a special frame to replace any given stud.

The advantage of this machine over those previously in use is that the notching operation is eliminated and yet the studs are precisely located and can be dropped into place faster and easier than if they have to be fitted into notches.

FIG. 10 illustrates the method of coiling the programming tape 13 for storage. A code number for quick identification can be marked on the pressure tape 65 used to hold the coil together.

The invention is not limited to the exemplary construction herein shown and described, but may be made in various ways within the scope of the appended claim.

What is claimed is:

1. In a control system for a machne tool performing repeated operations along a workpiece, an elongate base frame, a carriage supporting said workpiece and longitudinally movable relative to said base frame and supported thereon, a machine tool stationary relative to the length of said base frame and positioned to engage said workpiece, a tape attached to said carriage parallel to said workpiece and marks on said tape corresponding to the stations at which a machine operation is to be performed, an electric eye mounted adjacent to said base frame and adjusted to read said marks one at a time and to translate the same into signals, means responsive to said signals driving said carriage, and wherein said means comprises an electric motor, a reduction gear sprocket and chain attached to said carriage driven by said motor, an overrun clutch and electric brake between said motor and said reduction gear, whereby said clutch and brake accomplishes an instantaneous stop upon reception of said signal from said electric eye.

References Cited
UNITED STATES PATENTS

| | | | |
|---|---|---|---|
| 2,369,223 | 2/1945 | Ferger | 250—2191 XR |
| 3,093,778 | 6/1963 | Tidwell | 318—480 XR |
| 3,420,128 | 1/1969 | Russell | 83—71 |
| 2,406,299 | 8/1946 | Koulicovitch | 250—219 (ID) |
| 2,854,856 | 10/1958 | Oppen | 318—162 XR |
| 3,175,747 | 3/1965 | Comstock | 250—219 (ID) |
| 3,192,796 | 7/1965 | Peeps et al. | 318—162 XR |
| 3,192,808 | 7/1965 | Fielder et al. | 318—162 XR |
| 3,261,979 | 7/1966 | Thumim | 250—222 |

BENJAMIN DOBECK, Primary Examiner

U.S. Cl. X.R.

250—219